United States Patent [19]

Durth

[11] 4,058,635
[45] Nov. 15, 1977

[54] METHOD OF TREATING A FOODSTUFF IN AN OVEN WITH MOISTURE

[75] Inventor: Wilfried Durth, Burbach-Wahlbach, Germany

[73] Assignee: Buderus'sche Eisenwerke Aktiengesellschaft, Wetzlar, Germany

[21] Appl. No.: 638,158

[22] Filed: Dec. 5, 1975

Related U.S. Application Data

[63] Continuation-in-part of Ser. No. 376,447, July 5, 1973, abandoned.

[30] Foreign Application Priority Data

July 12, 1972 Germany .............................. 2234107

[51] Int. Cl.² .............................................. A23L 1/01
[52] U.S. Cl. .................................... 426/509; 426/510
[58] Field of Search ............... 426/523, 510, 509, 506, 426/520, 315, 233, 456, 466, 465, 511; 126/21, 21 A; 99/352, 346, 447, 467, 474

[56] References Cited

U.S. PATENT DOCUMENTS

| 213,029 | 3/1879 | Ashcroft | 426/523 |
| 3,248,221 | 4/1966 | Shulz et al. | 426/510 X |
| 3,294,548 | 12/1966 | Vischer | 426/510 |

FOREIGN PATENT DOCUMENTS 2,234,107   1/1974   Germany

Primary Examiner—S. Leon Bashore
Assistant Examiner—Kenneth M. Schor
Attorney, Agent, or Firm—Karl F. Ross

[57] ABSTRACT

An article of food is heated in an oven in which air is circulated. Moisture in the form of steam or a water spray is added to the air as it circulated several times during the cooking or thawing cycle according to a program. Each moisture dose and the length of the interval between doses is controlled independently according to the treatment desired. The first dose is made after the cooking cycle is started, and the dosing time is usually a fraction of the time between doses.

2 Claims, 7 Drawing Figures

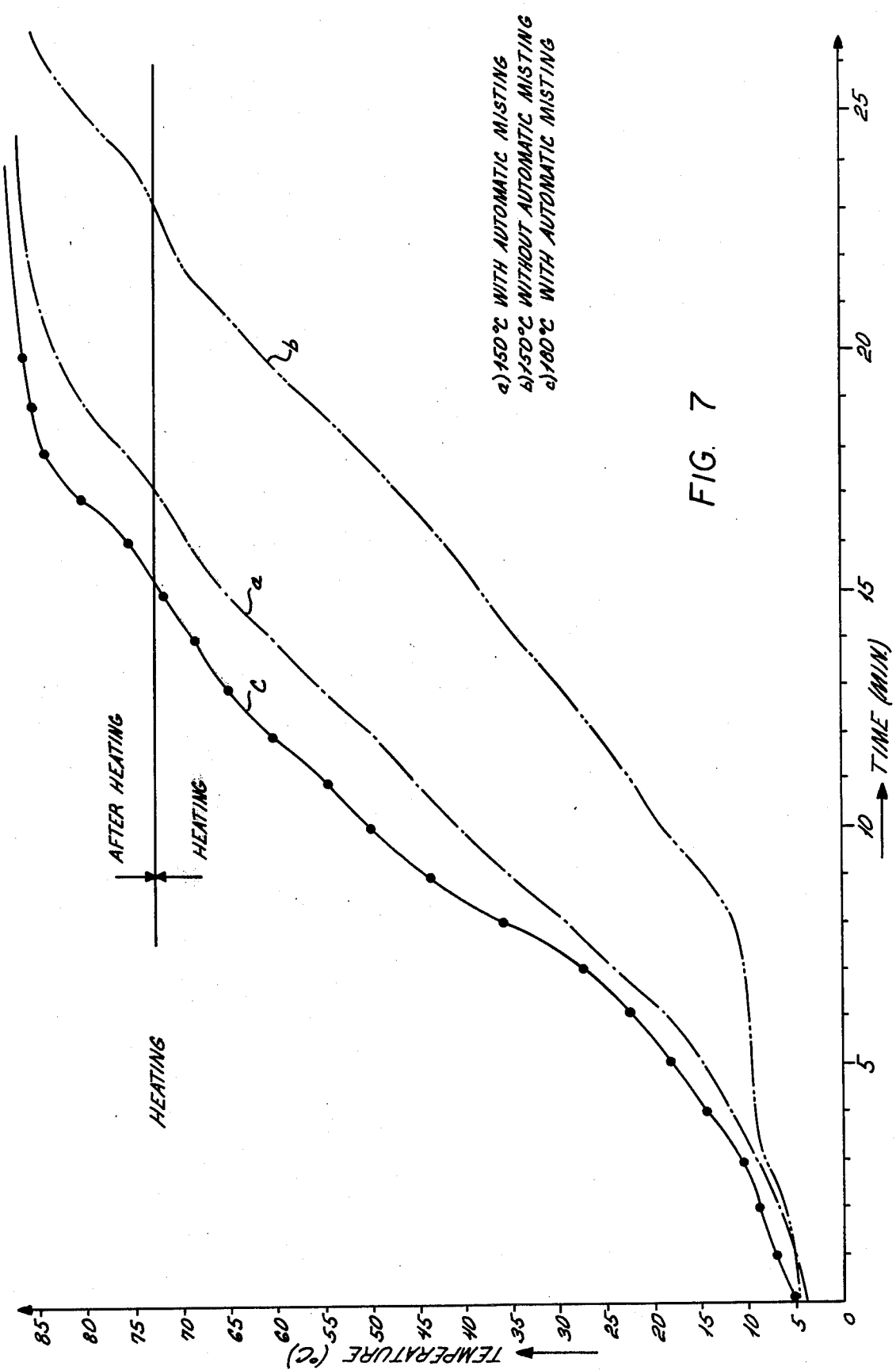

METHOD OF TREATING A FOODSTUFF IN AN OVEN WITH MOISTURE

CROSS-REFERENCE TO RELATED APPLICATIONS

This application is a continuation-in-part of copending patent application Ser. No. 376,447 filed 5 July 1973 and now abandoned and is related to application Ser. No. 343,537 filed 21 Mar. 1973 and now abandoned.

FIELD OF THE INVENTION

The present invention relates to a method of treating a foodstuff. More particularly, this invention concerns an oven wherein the foodstuff can be exposed to humidified air for cooking with controlled generation of smoke.

BACKGROUND OF THE INVENTION

Recent developments have shown that so-called circulating ovens are extremely advantageous for the roasting, baking, or thawing of foodstuffs. The air in such an oven is circulated at a relatively rapid rate so that all of the articles, whether on the middle or end shelves, are evenly cooked.

It has been found highly advantageous to inject a certain amount of water mist or steam into such an oven during cooking or thawing. Such treatment prevents meat, beef steaks for instance, from drying out when cooked at high temperatures, and often otherwise greatly enhances the appearance and flavor of the cooked item. In addition, a highly humid environment in the oven prevents cooking food from smoking, which in turn prevents the food from taking on a burnt taste and keeps the oven clean.

As a general rule such an oven is equipped with an internal water spray which is operated by an externally accessible valve. The cook merely turns on the mister after loading the trays into the oven, holding it on for an interval he deems sufficient. The sudden introduction of moisture is disadvantageous to the cooking operation.

OBJECTS OF THE INVENTION

It is, therefore, an object of the present invention to provide an improved system for treating a foodstuff or the like.

A further object is the provision of a method of operating an oven to control smoking.

SUMMARY OF THE INVENTION

These objects are achieved according to the present invention in a system wherein the circulating air in the cooking chamber is dosed with moisture at several separate times during the cooking cycle. Each dose imparts to the circulating air in the chamber an incremental quantity of liquid vapor which is determined by a program, the interval between doses being also determined by this program.

Such an arrangement creates a relatively even humidity level within the cooking chamber. There is no sudden peak in the humidity which would tend to saturate the item being cooked, nor is there any excessively dry period during which the foodstuff may burn or emit bursts of smoke or gas.

In accordance with another feature of this invention, the oven is provided with a sprayer to which water is fed according to a predetermined program. This program can be a plurality of spraying pulses of predetermined length which are separated always by the same interval or, if desired, by a changing interval. Determination of the proper humidity level for a particular kind of cooking is made and the controls are thereafter set at whatever setting was found to be optimal, or a program card or disk is inserted into the device. Of course, it is possible to provide the oven according to this invention with a program arrangement whereby the user need merely press buttons labeled ROAST BEEF, CAKE, and the like, or make settings of various controls according to a manual supplied with the unit. The misting pulse durations may be fractions of a minute while the intervals between pulses are 3 to 20 times greater.

According to another feature of this invention, the spraying time is equal to or less than the interval between spraying times. Such treatment has been found to produce the best results since such short bursts evidently create a humidity level which varies just enough to allow the food to cook properly while not varying sufficiently to allow the food to become sodden or dry out. The liquid can also be a vehicle for substances with which the comestible is to be treated.

BRIEF DESCRIPTION OF THE DRAWING

FIG. 7 is a graph illustrating the method of this invention.

SPECIFIC DESCRIPTION

Figure 1:
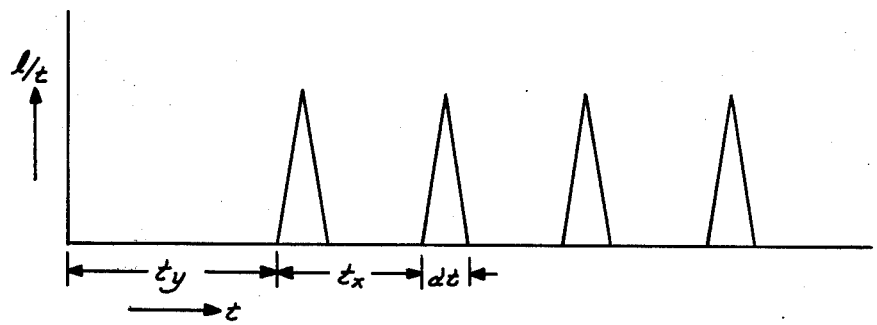
FIGS. 1 and 2 are pulse diagrams illustrating two methods of operation of the system according to this invention.
Figure 3:
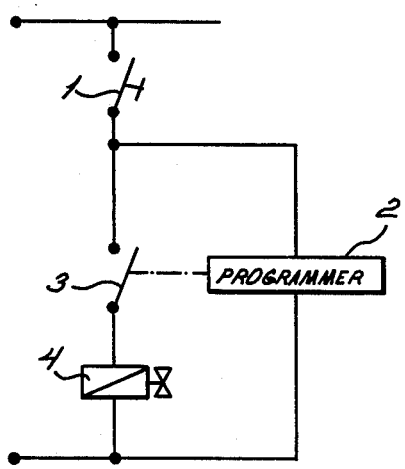
FIG. 3 is a circuit diagram illustrating principles of the present invention.

As generally shown in FIG. 3 a programmer 2 connectable to a source of line current by an ON-OFF switch 1 operates another switch 3 connected in series with a solenoid valve 4. FIG. 1 shows how this valve 4 can be actuated for periods of time $t$, plotted on the abscissa, which are not sufficiently long to allow the valve to open fully and permit a full flow of water. The initiations of the pulses of flow are separated by equal time intervals having a length $t_x$. The rate of flow of water through valve 4 is shown on the ordinate in liters per unit time ($1/t$).

Figure 2:
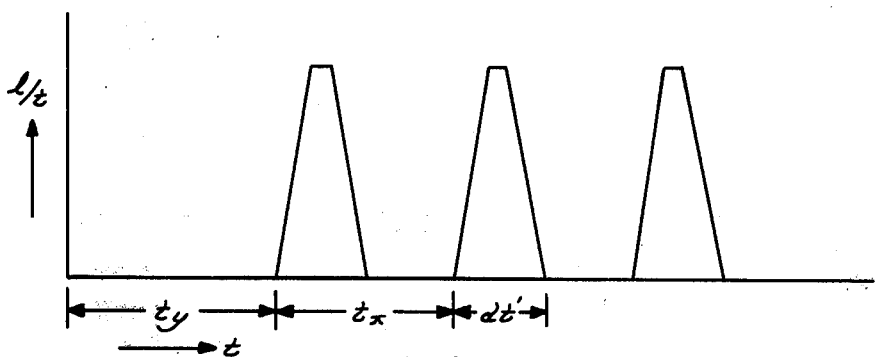

In FIG. 2, the pulses have a duration in time of $dt'$ which is sufficient to open the valve 4 completely, so that these pulses have flat tops, indicating a steady flow of water for a limited time.

Figure 4:
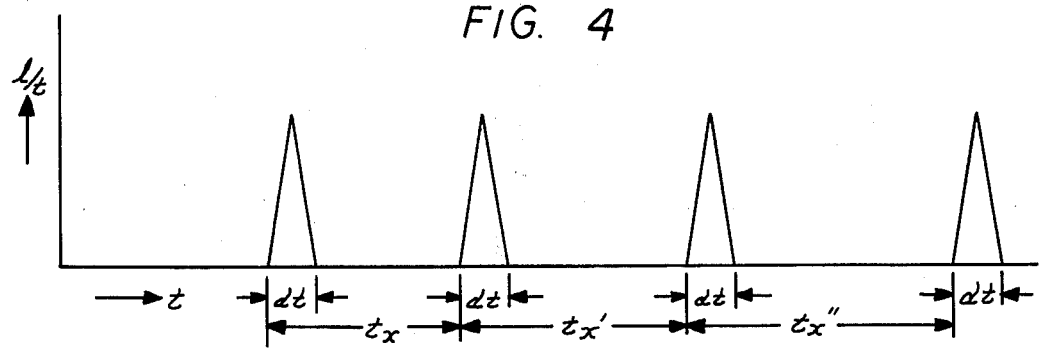
FIG. 4 is another pulse diagram illustrating a third method of operation of the present invention.
Figure 6:
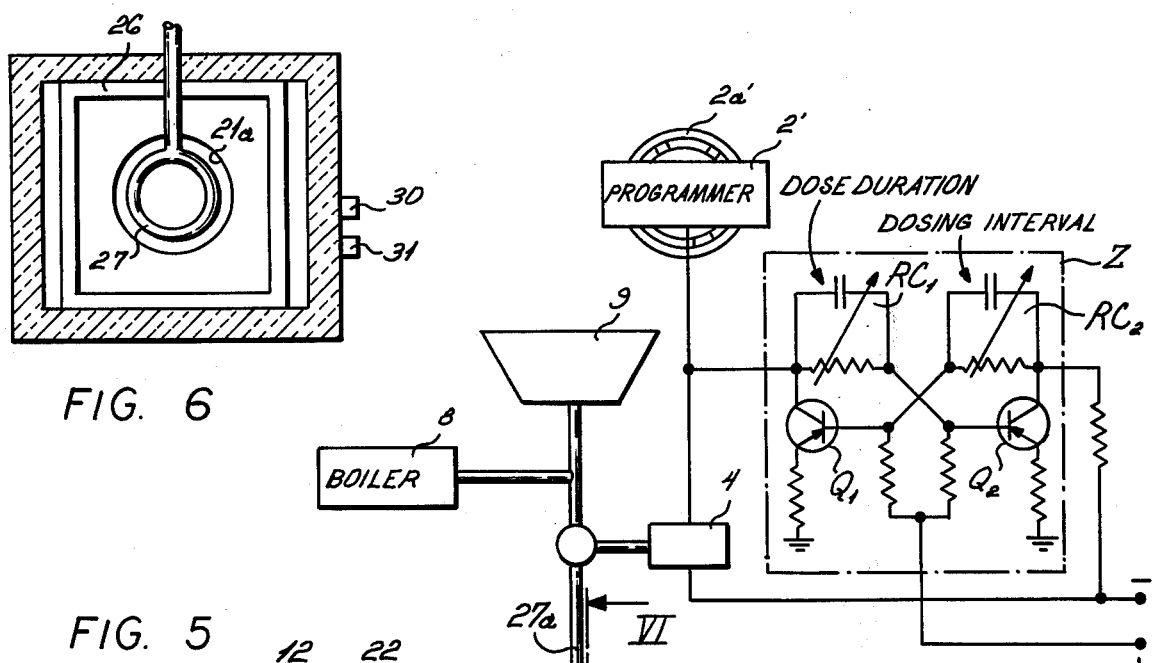
FIG. 6 is a section taken along line VI — VI of FIG. 5.

The diagram of FIG. 4 indicates that the pulses of length $dt$ can be separated by constantly increasing intervals $t_x$, $t_x'$, and $t_x''$. Such a program is advantageous for foodstuffs not likely to dry out once their outside is cooked.

Figure 5:
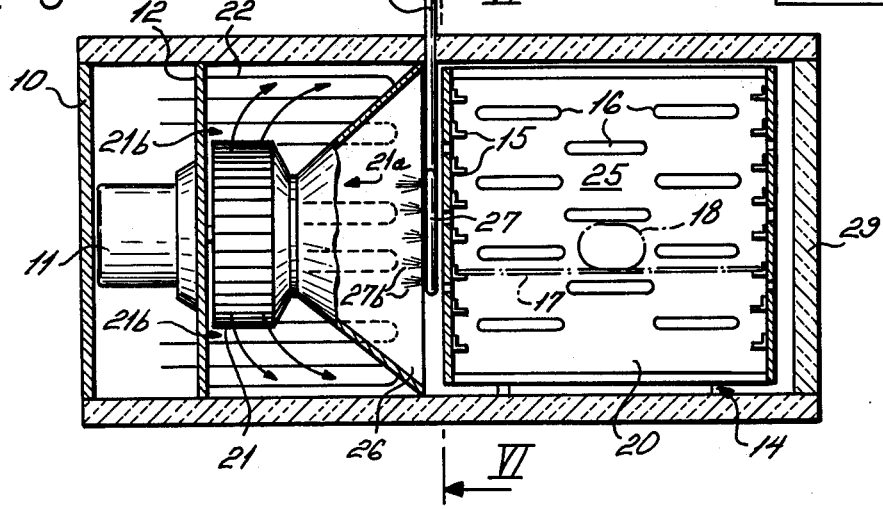
FIG. 5 is a partly schematic view of a system according to this invention.

As shown in FIG. 5, a housing 29 defines a food-treatment chamber 25 which encloses a rack 14 fitted with ledges 15 on which a shelf 17 (shown in dot-dash lines) carrying a piece of food 18 can slide. The rack 14 is spaced from the housing 29 and formed of perforated plates 20 and has slots 16 for passage of air therethrough.

A blower 21 mounted on a partition 12 and powered by a motor 11 in a compartment closed by a plate 10 has an axial input 21a and a radial output 21b. This blower 21 circulates air heated by a heating element 22 in the chamber 25, sucking it in again through a hood 26 for recirculation.

Directly in front of this axial input 21a is a circular spray pipe 27 provided with an inlet 27a and spray nozzles 27b, which can dispense liquid into the input 21a of the blower 21.

In order to humidify the chamber 25, water is sprayed from nozzles 27b while the blower 21 is running. The mist so formed is sucked into the axial input 21a and blown out through the output 21b and thereby fills the apparatus.

Such an oven is described in the commonly owned U.S. Pat. No. 3,550,576 issued Dec. 29, 1970 to Paul Sauer. A method of heating and controlling cooking in such an oven is described in my above-mentioned abandoned application Ser. No. 343,537.

The programmer here is a saturated resistor-capacitor coupled flip-flop having an ON transistor $Q_1$ and an OFF transistor $Q_2$ controlled by respective adjustable tuned circuits $RC_1$ and $RC_2$. The solenoid valve 4 is connected in the output circuit of ON transistor $Q_1$. The tuned circuit $RC_1$ is adjustable by a knob 30 to control the pulse length $dt$ and the tuned circuit $RC_2$ has an adjustment 31 for establishing the pulse interval $t_x - dt$. In addition, a programmer 2' which reads a program wheel 2a' can be employed to actuate the valve 4 according to an irregular program or one as shown in FIG. 4.

Water can be fed to the inlet pipe from a reservoir 9 or steam can be employed which is generated in a boiler 8. An oven-cleaning solvent can be added to the water in the reservoir 9 to coat the interior of the oven so as to facilitate cleaning it, as can a fumigant.

According to this invention, the interval between pulses, $t_x - dt$, is three times as long as the pulse length $dt$. In addition, the initial time $t_y$ between the start of the cooking cycle and the first pulse is always longer than $t_x$, since the foodstuff being cooked or thawed usually is moist enough at the beginning of the cycle.

In accordance with the present invention the dosing time $dt$ is between 0 seconds and 12 seconds and the time between doses, $t_x - dt$, is between 0 minutes and 5 minutes, the former preferably being between 0.3 seconds and 1.2 seconds and the latter between 0.25 minutes and 2 minutes.

Thus the knob 30 which controls the tuned circuit $RC_1$ has a scale reading from 0 to 12 seconds and the knob 31 controlling the tuned circuit $RC_2$ has a scale reading between 0 and 5 minutes. Water pressure is adjusted such that 80 cm³ of water are injected every second.

EXAMPLE I

A precooked room-temperature TV dinner having an overall food weight of 500 g constituted by 100 g of pork, 150 g of mashed potatoes, 150 g of gravy and 100 g of red cabbage is placed in an oven preheated to 200° C and having a volume of 0.25 m³. The oven thermostat is immediately turned back to maintain an internal temperature of 150° C and the controls 30 and 31 are set so as to inject water for a dosing time of 0.5 seconds with a quiescent time of 30 seconds between doses, 40 cm³ of water being introduced with each dosing cycle. As shown in dot-dash line $a$ in FIG. 7 the mashed potatoes attain the desired temperature of 73° in 17 minutes. At the same instant the meat has been heated to 83° C and the cabbage to 88° C.

EXAMPLE II

The same TV dinner is processed in the same manner as in Example I, except that no misting is carried out. After 22 minutes shown by double dot-dash line $b$ of FIG. 7 the mashed potatoes have attained the desired temperature of 73° C. At the same time the meat has attained a temperature of 80° C and the cabbage a temperature of 85° C. Thus the misting shortens cooking time by approximately 30%.

EXAMPLE III

The same TV dinner is processed in the same manner as employed in Example I, but the oven is maintained at 180° C after introduction of the dinner rather than at 150° C. As shown at solid line-curve $c$ in FIG. 7 the mashed potatoes attain a temperature of 70° C in only 15 minutes. At this time the meat has attained a temperature of 85° C and the cabbage a temperature of 88° C. Thus an increase in cooking temperature of 30° only shortens the heating time by 10%.

It is noted that in Examples I, II and III the goods continue to warm after being removed from the oven. This actually allows them to be taken from the oven before they reach the desired temperature since the outside of the item being heated is hotter than the inside and even after withdrawal from the oven an equalization of temperature will cause the internal temperature to rise. Thus it is possible with the system according to the invention in actuality to pull the foodstuffs as shown in Example I out after 12 minutes. It is noted that this after heating effect, shown by the graphs above the horizontal line 73° C, is deleterious with the foodstuffs prepared according to Example III as the mashed potatoes burn.

The Table sets forth the results of tests made in an oven identical to that used in Examples I - III, but employing a quiescent time of 1.5 minutes and using a thermostat setting of 120° C. In these Examples IV - XII the foodstuff being treated is a pate loaf held in a generally rectangular aluminum loaf pan having the given internal measurements.

TABLE

| Trial - Liver loaf | | | | | | | | | |
|---|---|---|---|---|---|---|---|---|---|
| Ex.-ample | Loaf Size Inside Measurements | Volume cm³ | Starting Weight g | Final Weight g | Cooking loss % | Cooking time min. | Cooking Temperature ° C | Oven capacity Loaves | kg |
| IV | 298/142/81 | 2730 | 2000 | 1900 | 5 | 75 | 70 | 15 | 30 |
| V | 290/105/81 | 2275 | 1500 | 1450 | 3.3 | 60 | 70 | 20 | 30 |
| VI | 234/114/70 | 1500 | 1000 | 950 | 5 | 60 | 70 | 20 | 20 |
| VII | 231/116/63 | 1640 | 1000 | 950 | 5 | 60 | 70 | 20 | 20 |
| VIII | 220/ 95/60 | 1090 | 750 | 700 | 6.5 | 500 | 70 | 35 | 24.5 |
| IX | 217/ 87/58 | 870 | 750 | 700 | 6.5 | 50 | 70 | 35 | 24.5 |

TABLE-continued

| Trial - Liver loaf Ex.-ample | Loaf Size Inside Measurements | Volume cm³ | Starting Weight g | Final Weight g | Cooking loss % | Cooking time min. | Cooking Temperature °C | Oven capacity Loaves | kg |
|---|---|---|---|---|---|---|---|---|---|
| X | 195/ 80/55 | 670 | 500 | 480 | 4 | 30 | 70 | 40 | 20 |
| XI | 190/ 80/52 | 640 | 500 | 480 | 4 | 30 | 70 | 40 | 20 |
| XII | 187/ 88/39 | 550 | 500 | 480 | 4 | 30 | 70 | 35 | 17.5 |

With the method according to the present invention it is possible to reheat items without drying them out and to heat up and cook foodstuff items much more quickly than has hitherto been possible. In Example IV, for instance, a liver loaf having a starting weight of 2 kg is fully cooked in 75 minutes. A smaller loaf, such as that of Example X having a weight of 0.5 kg, is cooked in a mere 30 minutes. Clearly the method according to the present invention allows a cooking operation to be accelerated greatly, thereby economizing both in terms of time and energy needed to supply the cooking heat.

I claim:

1. A method of treating a foodstuff comprising the steps of:
    confining said foodstuff in a substantially closed chamber;
    circulating air in said chamber over and into contact with said foodstuff;
    heating said air, said foodstuff being heated by said air at a temperature and for a time sufficient to cook said foodstuff; and
    intermittently and automatically adding moisture to the heated air in said chamber in pulses spaced apart by intervals said moisture being added periodically by injecting water into said air circulating in said chamber, said air being circulated so as to pass over said foodstuff a plurality of times during the treatment thereof, and said pulse duration being between 0.3 seconds and 1.2 seconds and said intervals being each between 0.25 minutes and 2 minutes.

2. The method defined in claim 1 wherein said air is heated to at least 120° C.

* * * * *